United States Patent [19]
Calderbank et al.

[11] Patent Number: 6,127,971
[45] Date of Patent: Oct. 3, 2000

[54] COMBINED ARRAY PROCESSING AND SPACE-TIME CODING

[75] Inventors: Arthur Robert Calderbank, Princeton; Ayman F. Naguib, New Providence, both of N.J.

[73] Assignee: AT&T Corp, New York, N.Y.

[21] Appl. No.: 09/114,838

[22] Filed: Jul. 14, 1998

Related U.S. Application Data

[60] Provisional application No. 60/052,689, Jul. 16, 1997.
[51] Int. Cl.[7] .............................. H01Q 3/26; H04B 14/04; H04B 15/00; H04B 1/10
[52] U.S. Cl. .......................... 342/368; 375/254; 375/285; 375/296; 375/349
[58] Field of Search ...................................... 342/368, 371, 342/372; 375/254, 265, 285, 296, 346, 347, 348, 349; 714/792

[56] References Cited

PUBLICATIONS

N. Seshadri, V. Tarokh, A.R. Calderbank, "Space–time codes for wireless communication: code construction", in Proceding of the 1997 IEEE Vehicular Technology Conference (VTC 47th), pp. 637–641, May 1997.

*Primary Examiner*—Thomas H. Tarcza
*Assistant Examiner*—Fred H. Mull

[57] ABSTRACT

Enhanced performance is realized in a wireless transmission arrangement that is subject to fading by employing a perspective that combines array signal processing with channel coding. Specifically, in accordance with our invention, antennas at the transmitter are partitioned into small groups, and individual space-time codes are used to transmit information from each group of antennas. At the receiver, an individual space-time code is decoded by a linear array processing technique that suppresses signals transmitted by other groups of antennas by treating them as interference.

20 Claims, 1 Drawing Sheet

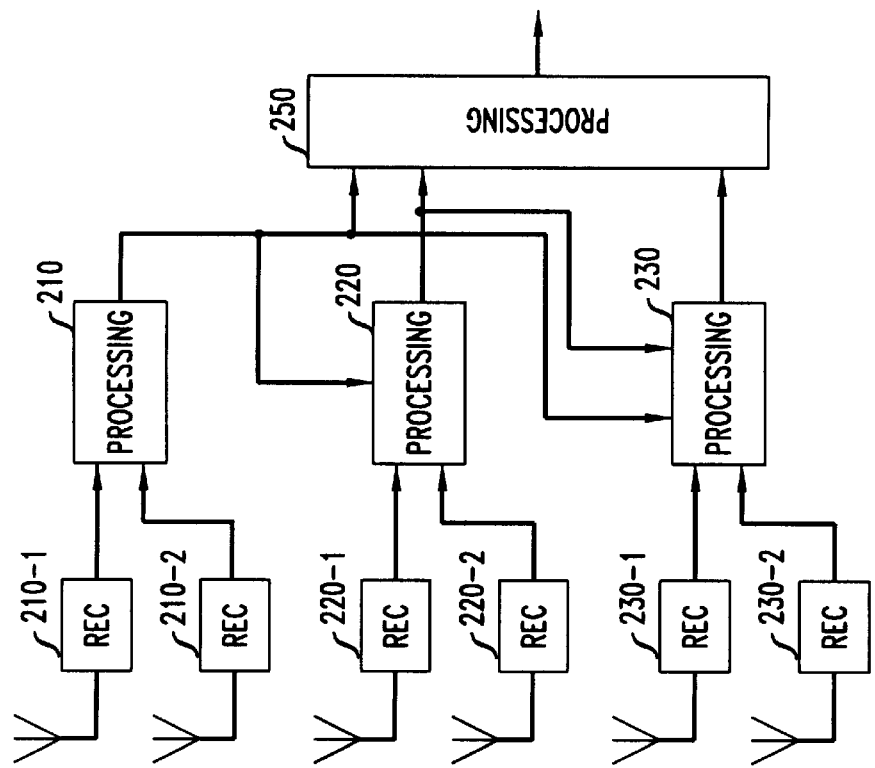
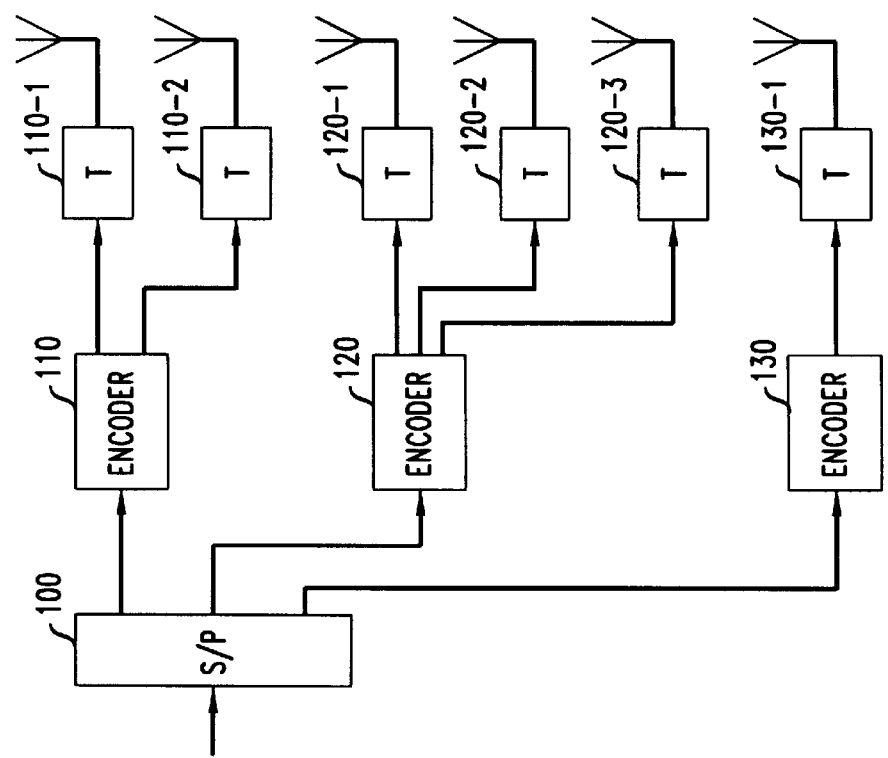

COMBINED ARRAY PROCESSING AND SPACE-TIME CODING

This patent application benefits from the priority of U.S. patent application Ser. No. 60/052,689, filed Jul. 16, 1997, the disclosure of which is incorporated herein by reference.

BACKGROUND OF THE INVENTION

This invention relates to communication, and primarily to wireless communication.

Physical limitations of wireless channels present a fundamental technical challenge to reliable communication. Bandwidth limitations, propagation loss, time variance, noise, interference, and multipath fading make the wireless channel a narrow "pipe" that does not easily accommodate the flow of data. Further challenges come from power limitation, size, and speed of devices that are employed within portable wireless apparatus. Employing multiple transmit antennas at both the base and the remote stations increases the capacity of wireless channels, and information theory provides a measure of this increase. The standard approach to exploit this capacity is linear processing at the receiver, as described, for example, by J. Winters, J. Salz and R. D. Gitlin, in "The impact of antenna diversity an the capacity of wireless communication systems" *IEEE Trans. Communications*, Vol. 42. No. 2/3/4, pp. 1740–1751, Feb/March/April 1994. Transmit diversity has been explored by Wittneben in "Base station modulation diversity for digital SIMULCAST," *Proc. IEEE'VTC*, pp. 505–511, May 1993, and by Seshadri and Winters in "Two signaling schemes for improving the error performance of frequency-division-duplex (FDD) transmission systems using transmitter antenna diversity," *International Journal of Wireless Information Networks*, Vol. 1, No. 1, 1994. The Wittneben and Seshadri et al papers approach transmit diversity from a signal processing point of view.

Space-time codes combine signal processing at the receiver with coding techniques appropriate to multiple transmit antennas. See, for example, V. Tarokh, N. Seshadri, and A. R. Calderbank in "Space-Time Codes For High Data Rate Wireless Communication: Performance Analysis and Code Construction," *IEEE Trans. Info. Theory*, Vol. 44, No. 2, pp. 744–765, March 1998. The space-time approach provides significant gain over the aforementioned prior art. Specific space-time codes designed for 2–4 transmitting antennas perform well in slowly varying fading environments (such as indoor transmission) and come with in 2–3 dB of the theoretical outage capacity. Outage capacity is described, for example, by J. Foschini, Jr. and M. J. Gans, "On limits of wireless communication in a fading environment, when using multiple antennas," *Wireless Personal Communication*, Vol. 6, No. 3, pp. 311–335, March 1998. The bandwidth efficiency of the codes described in the Tarokh et al paper is about 3–4 times that of the current systems. The most important contributor to the improved performance is diversity, which may be thought of as providing a number of replicas of the transmitted signal to the receiver, with some replicas being less attenuated by fading. The space-time codes presented in the Tarokh et al paper provide an optimized trade-off between constellation size, data rate, diversity gain, and trellis complexity When the number of transmit antennas is fixed, decoding complexity (measured by the number of trellis states in the decoder) increases exponentially with transmission rate. This can be refined to some extent by designing space-time codes with a multi-level structure and adopting multi-stage decoding, as described by Tarokh et al. For a moderate number of transmit antennas (3–6), this method provides higher data rates while reducing the decoding complexity. However, there is a penalty to be paid for simplified decoding. Multi-stage decoding is sub-optimal, due in part to magnification in the error coefficient, and this performance penalty means that alternative solutions are needed for achieving very high data rates.

In order to achieve very high data rates on narrowband wireless channels, many antennas are needed at both the transmitter and the receiver. Consider a wireless communication system employing n transmit and m receive antennas, where the subchannel between each transmit and receive antenna is quasi-static Rayleigh, flat, and independent of others. If n is fixed, then the capacity increases logarithmically with m. On the other hand, if m is fixed then intuition suggests that there must come a point where adding more transmit antennas will not make much difference. Indeed, this can be seen in the mathematics of outage capacity, shown by Foschini and Gans in the aforementioned paper. Thus, it turns out that, in the presence of one receive antenna, little can be gained in terms of outage capacity by using more than 4 transmit antennas. A similar argument shows that if there are two receive antennas, using 6 transmitting antennas provides almost all of the capacity increase that can be obtained.

If n increases and $m \geq n$, then information theory shows that the capacity of the system increases at least linearly as a function of n. Thus, it makes sense to increase the number of antennas at both receiver and transmitter in order to obtain higher capacities. Employing many antennas at both transmitter and receiver create a multiple-input multiple-output system where the number of degrees of freedom is given by the product of the number of transmit and receive antennas.

Foschini considered such a system in "Layered space-time architecture for wireless communication in a fading environment when using multi-element antennas," *Bell Labs Technical Journal*, Vol. 1, No. 2, Autumn 1996. He proposed a multi-layered structure that, in principle, can achieve a tight lower bound on the capacity. If n transmit and n receive antennas are used, then at the receiver the transmitted signal from transmit antenna 1 is treated as the desired signal, while the signals transmitted from other transmit antennas are treated as interference. Linear processing is then used to suppress the interfering signals using n receive antennas, providing a diversity gain of one. Once the signal transmitted from antenna 1 is correctly detected, the signal transmitted from antenna 2 is treated as the desired signal while the signals transmitted from transmit antennas 3, 4, . . . , n are treated as interference. The contribution of the signal transmitted from antenna 1, now that it has been detected, is subtracted from the signal received at receiver antennas 1 through n. Thereafter, detection of the signal transmitted by antenna 2 proceeds with linear processing that is applied to suppress the interfering signals from antennas 3 through n. This provides a diversity gain of two. This process is repeated until all the transmitted signals are detected. Clearly, the worst case diversity in this architecture is one. For such a system, long frames of data combined with powerful coding techniques are needed to achieve the lower bound on outage capacity.

SUMMARY

We realized that the Foschini approach described above is purely a signal processing one, and that enhanced performance can be realized by employing a perspective that combines array signal processing with channel coding. Specifically, in accordance with our invention, antennas at the transmitter are partitioned into small groups, and individual space-time codes are used to transmit information from each group of antennas. At the receiver, an individual space-time code is decoded by a linear array processing technique that suppresses signals transmitted by other groups of antennas by treating them as interference. The contribution of the decoded signal to other received signal is then subtracted from those received signals. What results is a simple receiver structure that provides diversity and coding gain over uncoded systems with a given diversity gain. This combination of array processing at the receiver and coding techniques for multiple transmit antennas provides reliable and very high data rate communication over wireless channels. One advantage of the group interference suppression method over the Foschini architecture is that the number of receive antennas can be less than the number of transmit antennas.

DETAILED DESCRIPTION

This disclosure contemplates a wireless communication system with n antennas at the base and m antennas at the mobile station. As indicated above, such a system can be viewed as a multiple-input multiple-output system where the number of degrees of freedom is given by the product of the number of transmit and receive antennas. The approach disclosed here is to employ a small fraction of these degrees of freedom for improving the performance while using the remaining degrees of freedom to achieve higher data rates. This leads to a combination of space-time coding at the transmitter and array processing at the receiver, which achieves high data rates and operates close to the limits given by outage capacity.

In prior art arrangements where n transmitting antennas are employed, data to be transmitted by the base station is encoded using a channel code, is passed through a serial to parallel converter (or a multiplexing switch) and is divided into streams of data. Each stream of data is used as the input to a pulse shaper, and the output of each shaper is modulated and transmitted out. At each time slot, t, the output of antenna i is a signal $c_t^i$ ($1 \leq i \leq n$). It should be emphasized that the n signals are transmitted simultaneously, each from a transmitting antenna of a different modulator, and that all these signals have the same transmission period T.

The signal at each of the m receiver antennas is a superposition of the n transmitted signals, corrupted by noise and fading. Specifically, the signal $r_t^i$ received by antenna j at time t is given by $$r_t^j = \sum_{i=1}^{n} \alpha_{i,j} c_t^i + \eta_t^j. \tag{1}$$

The coefficients $\alpha_{i,j}$ is the path gain from transmit antenna i to receive antennas j, and these coefficients capture the transfer characteristics between transmit and receive antennas. The noise on the channel between transmit antenna i and receive antenna is represented by $\eta_t^j$. The $\alpha_{i,j}$ coefficients are modeled as samples of independent complex Gaussian random variables with mean zero and variance 0.5 per dimension. This results from the assumption that signals transmitted from different antennas undergo independent Rayleigh fades. The noise quantities $\eta_t^j$ are samples of independent complex Gaussian random variable with mean zero. It is also assumed that the $\alpha_{i,j}$ coefficients are constant during a frame data, but may vary from one frame to another (some artisans call this "quasi-static" fading). A "frame" of data is a collection of a present number of consecutively arriving data bits, where the collection is considered as a unit.

Equation (1), which describes the signal of one receiver antenna, can be expanded to cover all of the receiver antennas. Using conventional vector notations, equation (1) can be written as $$r_t = \Omega c_t + \eta_t \tag{2}$$

where $$c_t = (c_t^1, c_t^2, \ldots, c_t^n)^t$$
$$r_t = (r_t^1, r_t^2, \ldots, r_t^m)^t$$
$$\eta_t = (\eta_t^1, \eta_t^2, \ldots, \eta_t^m)^t \tag{3}$$

and $$\Omega = \begin{pmatrix} \alpha_{1,1} & \alpha_{2,1} & \cdots & \alpha_{n,1} \\ \alpha_{1,2} & \alpha_{2,2} & & \alpha_{n,2} \\ \vdots & & \ddots & \vdots \\ \alpha_{1,m} & \alpha_{2,m} & \cdots & \alpha_{n,m} \end{pmatrix}. \tag{4}$$

Combined Array Processing and Space-Time Coding

The space-time product encoder employed herein apportions a frame of incoming stream of bits into time slots of duration T, accepts a block of B input bits in each time slot t, and divides the accepted bits into q strings of lengths $B_1$, $B_2, \ldots, B_q$ $$\left( B = \sum_{k=1}^{q} B_k \right).$$

Moreover, in accordance with the present disclosure, the n transmitting antennas are partitioned into q groups $G_1$, $G_2$, ..., $G_q$, with each group $G_k$ having $n_k$ antennas $$\left( n = \sum_{k=1}^{q} n_k \right),$$

and each of the q strings $B_k$, k=1, 2, ..., q, is assigned to a different one of the q transmitting antenna groups. More specifically, each string $B_k$ is encoded by a space-time encoder $C_k$, which develops $n_k$ symbols, and the encoded signal is transmitted by group $G_k$ of the transmitting antennas. This gives a total of n sequences of constellation symbols that are transmitted simultaneously from the n transmitting antennas.

We view a space-time product encoder of the type described above as a set of q space-time encoders that are the component codes, operating in parallel on the same wireless communication channel. Each of the encoders $C_k$ uses $n_k$ transmit and m receive antennas for k=1, 2, ..., q. The complete product code is denoted by $C_1 \times C_2 \times, \ldots, \times C_q$.

Receiver Side

The task on the receiver side is to recover the transmitted data. One approach is to jointly decode all transmitted codewords, but shear complexity is the major difficulty with such an approach. If a diversity of r×m is required, where $r \leq \min(n_k)$, then the complexity of the trellis of $C_k$ is at least $2^{B_k(r-1)}$ states, and the complexity of the product code is at least $2^{B(r-1)}$ states. This means that if B is very large, the comprehensive joint decoding approach may be too complex to implement.

Hence, the novel approach of this disclosure employs the notion of group interference suppression. The idea is to decode each code $C_k$ separately while suppressing signals from other component codes. This approach has a much lower complexity but achieves a lower diversity order than the full diversity order m×n of transmit and receive antennas. More specifically, the receive antennas are divided into q groups, and the signals of each group of antennas are handled as a collection of signals from which one of the encoded signals transmitted by a group of transmitting antennas is decoded.

To describe group interference suppression method, without loss of generality, the following the signal decoding carried out by the first group of receiving antennas, where the signal encoded with $C_1$ is decoded. In this case, there are n−$n_1$ interfering signals. Equation (4) can be decomposed into $$\Omega = \Omega(C_1) | \Lambda(C_1) \qquad (5)$$

where $$\Omega(C_1) = \begin{pmatrix} \alpha_{1,1} & \alpha_{2,1} & \cdots & \alpha_{n_1,1} \\ \alpha_{1,2} & \alpha_{2,2} & & \alpha_{n_1,2} \\ \vdots & & \ddots & \vdots \\ \alpha_{1,m} & \alpha_{2,m} & \cdots & \alpha_{n_1,m} \end{pmatrix} \qquad (6)$$

and $$\Lambda(C_1) = \begin{pmatrix} \alpha_{n_1+1,1} & \alpha_{n_1+2,1} & \cdots & \alpha_{n,1} \\ \alpha_{n_1+1,2} & \alpha_{n_1+2,2} & & \alpha_{n,2} \\ \vdots & & \ddots & \vdots \\ \alpha_{n_1+1,m} & \alpha_{n_1+2,m} & \cdots & \alpha_{n,m} \end{pmatrix} \qquad (7)$$

and one can observe that $\Lambda(C_1)$ has a rank less than or equal to the number of its columns.

Thus, $R[\Lambda(C_1)] \leq n-n_1$, where $R[\Lambda(C_1)]$ denotes the rank of $\Lambda(C_1)$.

It is known that N, the null space of this matrix, is the set of all row vectors x such that $x\Lambda(C_1)=(0,0,\ldots,0)$. It is also known that $$\dim(N) + R[\Lambda(C_1)] = m. \qquad (8)$$

Since $R[\Lambda(C_1)] \leq n-n_1$, it follows that $\dim(N) \leq m-n+n_1$. Therefore, a set of orthonormal vectors $\{V_1, V_2, \ldots, V_{m-n+n1}\}$ can be computed in N (though not necessarily a unique set). Algorithms for computing $V_k$, k=1,2,…, m−n+$n_1$ are well known. See, for example, Gilbert Strang, Linear Algebra and Its Applications.

Setting $$\Theta(C_1) = \begin{bmatrix} v_1 \\ v_2 \\ \vdots \\ v_{m-n+n_1} \end{bmatrix} \qquad (9)$$

and multiplying both sides of the Equation (2) by $\Theta(C_1)$ yields $$\Theta(C_1)r_t = \Theta(C_1)\Omega c_t + \Theta(C_1)\eta_t. \qquad (10)$$

Replacing $\Omega$ by its equivalent from equation (5), and noting that $\Theta(C_1)\Lambda(C_1)=0$ is the all zero matrix, equation (7) can be written as $$\Theta(C_1)r_t = \Theta(C_1)\Omega(C_1)c_t^1 + \Theta(C_1)\eta_t. \qquad (11)$$

which can be rewritten as $$\tilde{r}_t = \tilde{\Omega} c_t^1 + \tilde{\eta}_t \qquad (12)$$

where $$c_t^1 = (c_t^2, \ldots, c_t^{n1})^t$$

$$\tilde{r}_t = \Theta(C_1) r_t$$

$$\tilde{\eta}_t = \Theta(C_1) \eta_t$$

and $$\tilde{\Omega} = \Theta(C_1)\Omega(C_1). \qquad (13)$$

This is an equation where all the signal streams out of antennas $n_1+1$, $n_1+2$, …, n are suppressed.

The Receiver

In the following discussion, it is assumed that $\Lambda(C_1)$ and $\Theta(C_1)$ are known through some means (for example, through a sending of a known signal from one transmitting antenna at a time, measuring results, and determining therefrom the values of $\alpha_{i,j}$), and that the receiver outputs a set of orthonormal vectors $\{V_1, V_2, \ldots, V_{m-n+n1}\}$. Letting $$\Omega_{ij} = \Theta(C)\Omega(C_1), \qquad (14)$$

results in $\Omega_{ij} = v_i w_j$, where $w_j$ is the j-th column of $\Omega(C_1)$. The random variable $\Omega_{ij}$ has zero mean, given the characteristics of $\Lambda(C_1)$. Moreover, $$E[\Omega_{ij}\Omega_{lk}] = E[v_i w_j w^*_k v^*_l] = v_i E[w_j w^*_k] V^*_l = \delta_{jk} v_i v^*_l = \delta_{jk}\delta_{il} \qquad (15)$$

where $\delta$ is the Kronecker delta function given by $\delta_{rs}=0$ if r≠s. Hence, the elements of the $(m-n+n_1) \times n_1$ matrix $\tilde{\Omega}_{ij}$ are independent complex Gaussian random variables of variance 0.5 per real dimension. Similarly, the components of the noise vector $\tilde{\eta}_t$, t=1,2,…,l are independent Gaussian random variables of variance $N_o/2$ per real dimension.

Assuming that all the codewords of $C_1$ are equi-probable and given that group interference suppression is performed, the proposed receiver for $C_1$ decides in favor of the codeword $$c_1^1 c_1^2 \ldots c_1^{n1} c_2^1 c_2^2 \ldots c_2^{n1} \ldots c_t^1 c_t^2 \ldots c_t^{n1}, \qquad (16)$$

if it minimizes the decision metric $$\sum_{t=1}^{l} |\tilde{r}_t - \tilde{\Omega} c_t^1|^2. \qquad (17)$$

This means that following the execution of group interference suppression, the decoder of $C_1$ treats the vector $\tilde{r}_t$ as the received word at time t and the matrix $\tilde{\Omega}$ as the matrix of path gains.

If the code $C_1$ is a space-time trellis code, then the branch metric for a branch labeled with $c_t^1 c_t^2 \ldots c_t^{n_1}$ at time t is $|\tilde{r}_t - \tilde{\Omega} c_t^1|^2$.

It can be shown that, under the assumptions made so far, the probability of error in a system that uses n transmit antennas and m receive antennas (m≥n−$n_k$+1), for $C_1$ using the group interference suppression method, is the same as the probability of error in a system that comprises $n_k$ transmit antennas and m−n+$n_k$ receive antennas (for the same average power).

This fact reduces code design code design for a multiple antenna communication system with n transmit and m receive antennas to that of designing codes for communication systems with $n_k$ transmit antennas and in $m-n+n_k$ receive antennas, where $$n = \sum_{k=1}^{q} n_k$$

and $n_k \geq n-m+1$. Using this insight, a multi-layered space-time coded modulation embodiment can be designed. The idea, behind such a system is multistage detection and cancellation.

Suppose that $C_1$ is decoded correctly using combined array processing and space-time coding. From the above, it can be observed that the space-time code $C_1$ affords a diversity gain of $n_1 \times (m-n+_1)$. After decoding $C_1$, we may subtract the contribution of these codewords to signals received at different antennas. This gives a communication system with n−n, transmit and m receive antennas. We next use combined array processing and space-time coding to decode $C_2$. The space-time code $C_2$ affords a diversity gain of $n_2 \times (m-n+n_1+n_2)$. Proceeding in this manner, we observe that by subtracting the contribution of previously decoded code streams $C_j$, $j \leq k-1$ to the received signals at different antennas, the space-time code $C_k$ affords a diversity gain of $n_k \times (m-n+n_1+n_2 + \ldots + n_k)$.

We can choose space-time codes $C_i$, $1 \leq i \leq q$ to provide these diversity gains, such that the sequence $$n_1 \times (m-n+n_1), n_2 \times (m-n+n_1+n_2), \ldots, n_k \times (m-n+n_1+n_2+\ldots+n_k), \ldots, n_q m$$

be an increasing sequence. Assuming there was no decoding error in steps $1, 2, \ldots, k-1$, then at decoding step k, the probability of error for the component code $C_k$ is equal to the probability of error for $C_k$ when employed in a communication system using $n_k$ transmit and $m-n+n_1+n_2+\ldots +n_k$ receive antennas.

Since the diversity in each decoding stage k is more than that of the previous decoding stage k−1, the transmit power out of each antenna at level k can be substantially less than that of the previous layer. Thus the transmitter should divide the available transmit power amongst different antennas in an unequal manner. Power allocation for this scenario is straightforward. In fact powers at different levels could be allocated based on the diversity gains. In this way, the allocated powers can be engineered to decrease geometrically in terms of the diversity gains.

Alternatively, to speed operations, the detection of all stages can be performed simultaneously for each code $C_k$.

The FIG. 1 presents an embodiment where q=3, the number of transmitting antennas in groups 1, 2, and 3, is 2, 3, and 1, respectively, and the number of receiving antenna is 2 in each of the three receiver groups. More specifically, incoming frames of B bits are applied to serial to parallel converter 100 (or multiplexing switch), and the converter creates q collections (q=3) of $B_k$ bits each such that $$B = \sum_{k=1}^{q} B_k.$$

The first collection is applied to encoder 110, the second collection is applied to encoder 120, and the third collection is applied to encoder 130. Encoder 110 encodes the signal in accordance with $C_1$ and develops two symbols for each collection of B bits; encoder 120 encodes the signal in accordance with $C_2$ and develops three symbols for each collection of B bits; and encoder 130 encodes the signal in accordance with $C_3$ and develops one symbol for each collection of B bits. The symbols of encoders 110–130 are modulated in transmitters 110-1, 110-2, 120-1, 120-2, 120-3, and 130-1 and transmitted through their respective antennas.

The receiver side of the figure includes three groups, with each group containing two receiver sections. Thus, the figure shows receiver 210-1 and 210-2, receivers 220-1 and 220-2, and receivers 230-1 and 230-2. The outputs of each of the receivers in each group is applied to a respective processing unit (210, 220, and 230), and the outputs of processing units 210, 220, and 230 are applied to a processing unit 250 which develops the received output frame. The receiver of FIG. 1 is of the type where the receivers employ knowledge gained from other receivers. Accordingly, processing unit 220 is responsive to the output of processing unit 210, and processing unit 230 is responsive to the outputs of processing units 210 and 220.

The operation of encoders 110–130 is conventional. Illustratively, the $C_1$, $C_2$, and $C_3$ codes are trellis codes that develop 2 symbols, 3 symbols, and 1 symbol, respectively and form the component codes of a product code. Trellis code encoders are conventional.

The processing carried out in processor 210 follows the above teachings. Having knowledge of the $\alpha_{i,j}$ values (through conventional means that form no part of this invention), the matrix $\Lambda(C_1)$ (equation (7)) is constructed in processor 210, a set of vectors $\{v_1, v_2, \ldots, v_{m-n+n1}\}$ is calculated, and the matrix $\Theta(C_1)$ is thus constructed. The signal received by receivers 210-1 and 210-2 is multiplied by $\Theta(C_1)$ to yield $\tilde{r}_{tt}$ of equation (12). Forming the product matrix $\Omega = \Theta(C_1)\Omega(C_1)$ allows processor 210 to select the codeword $c_t^1$ that minimizes equation (17).

The processing carried out in processor 220 and 230 can be identical in form to the processing carried out in processor 210 (with coding, $\theta(C_2)$ and $\Theta(C_3)$, and $\{v_1, v_2, \ldots, v_{m-n+n2}\}$ and $\{v_1, v_2, \ldots, v_{m-n+n3}\}$, respectively. Alternatively, as discussed above, after decoding $C_1$, the contribution of these codewords to signals received at different antennas can be subtracted and, to that end, the FIG. 1 embodiment shows a connection from the output of processor 210 to processors 220 and 230, and a connection from the output of processor 220 to processor 230.

The above disclosure presented the principles of our inventions, but it should be appreciated that various modifications can be employed without departing from the spirit and scope of this invention. For example, the embodiments describe realize diversity in the spatio-temporal domain. However, other means for creating diversity, such as utilizing the frequency domain, are also possible.

We claim:

1. A method for transmitting signal over n antennas comprising the steps of:

partitioning the antennas into q groups, where each group has $n_k$ antennas, where at least for some value of k $n_k \geq 2$, and $$n = \sum_{k=1}^{q} n_k;$$

partitioning a frame of bits into q bit-groups of B bits each, where each bit-group has $B_k$ bits and $$B = \sum_{k=1}^{q} B_k;$$

encoding each bit-group of $B_k$ bits with coder $C_k$ to develop $n_k$ symbols; and transmitting the $n_k$ symbols over respective one of said $n_k$ antennas.

2. The method of claim 1 where said $C_k$ is a component code of a product code $C_1 \times C_2 \times, \ldots, \times C_q$.

3. The method of claim 1 where said $C_k$ is a trellis code.

4. A method for decoding signals received over m receiving antennas comprising the steps of:

receiving a signal at each of the receiving antenna, partitioning the m receiving antennas into q groups, decoding the signals received by the antennas of a group k with code $C_k$, where codes $C_1, C_2, \ldots, C_q$ for component codes of a product code $C_1 \times C_2 \times, \ldots, \times C_q$, while suppressing signals from other component codes.

5. The method of claim 4 where the signal received at each of the receiving antennas corresponds to a collection of signals transmitted from q groups of transmitting antennas, and where group k of transmitting antennas transmits $n_k$ symbols that result from encoding a block of $B_k$ bits with a coder employing code $C_k$.

6. The method of claim 4 where said decoding for receiving antenna group k is independent of decoding for receiving antenna group j≠k.

7. The method of claim 4 where said decoding for receiving antenna group k is responsive to outputs decoded for receiving antenna groups j<k.

8. The method of claim 7 where, in decoding for receiving antenna group k, the contribution to the signal received at the antennas of group k from signal decoded for receiving antenna groups j<k is subtracted from the signal received at the antennas of group k.

9. A transmitter comprising:

means for partitioning an applied frame of B bits into q bit-groups where bit-group k has $B_k$ bits and $$B = \sum_{k=1}^{q} B_k;$$

q encoders, with encoder k, k=1,2, . . . ,q, being responsive to bit-group k, where the encoder k encodes the $B_k$ bits into $n_k$ symbols; and means for transmitting each of the symbols developed by said q encoders out of n transmitting antennas, where $$n = \sum_{k=1}^{q} n_k.$$

10. The transmitter of claim 9 where said q encoders develop n symbols and the n-th symbol is transmitted by the n-th transmitting antenna.

11. The transmitter of claim 10 where the n symbols are transmitted out of the n transmitting antennas simultaneously.

12. The transmitter of claim 9 where said means for transmitting includes a modulator.

13. The transmitter of claim 9 where each of said q encoders employs an encoding code $C_k$ that is a component code of a product code $C_1 \times C_2 \times, \ldots, \times C_q$.

14. The transmitter of claim 13 where each code said $C_k$ is a trellis code.

15. A receiver comprising:

in antennas coupled to m receivers, q processing units, each coupled to $m_k$ of said receivers, where $m_k$ is an integer such that $$m = \sum_{k=1}^{q} m_k,$$

and means for combining output signals decoded by said q processing units.

16. The receiver of claim 15 where each of said processing unit includes a decoder employing a code$C_k$ that is a component code of a product code $C_1 \times C_2 \times, \ldots, \times C_q$.

17. The receiver of claim 15 where processing unit k subtracts a computed contribution to signals received at antennas coupled to said processing unit k of signals detected by processing units j<k.

18. The receiver of claim 16 where said code $C_k$ is a trellis code.

19. A method for transmitting signal over n antennas comprising the steps of:

in response to an applied frame of signals, developing q streams of codewords, where q is less than n, where the streams of codewords are independent of each other, and where the codewords within a stream are correlated to each other; and transmitting the S streams of codewords over said n antennas.

20. The method of claim 19 where each stream of codewords k is transmitted by a group of said antennas having $n_k$ antennas and $$n = \sum_{k=1}^{q} n_k.$$

* * * * *

UNITED STATES PATENT AND TRADEMARK OFFICE
CERTIFICATE OF CORRECTION

PATENT NO. : 6,127,971
DATED : October 3, 2000
INVENTOR(S) : Arthur Robert Calderbank, et al.

It is certified that error appears in the above-identified patent and that said Letters Patent is hereby corrected as shown below:

<u>Title page</u>,
"Inventors" filed should be:

Inventors: Arthur Robert Calderbank, Princeton; Ayman Naguib, New Providence; Nambirajan Seshadri, Chatham; Vahid Tarokh, Madison; all of NJ.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*